(12) United States Patent
Kern et al.

(10) Patent No.: US 9,094,194 B2
(45) Date of Patent: Jul. 28, 2015

(54) METHOD AND SYSTEM FOR AUTOMATING THE RECOVERY OF A CREDENTIAL STORE WHEN A USER HAS FORGOTTEN THEIR PASSWORD USING A TEMPORARY KEY PAIR CREATED BASED ON A NEW PASSWORD PROVIDED BY THE USER

(75) Inventors: David S. Kern, Billerica, MA (US); Shiu F. Poon, Cambridge, MA (US); Robert J. Paganetti, Scituate, MA (US)

(73) Assignee: International Business Machines Corporation, Armonk, NY (US)

( * ) Notice: Subject to any disclaimer, the term of this patent is extended or adjusted under 35 U.S.C. 154(b) by 2036 days.

(21) Appl. No.: 11/379,088

(22) Filed: Apr. 18, 2006

(65) Prior Publication Data

US 2007/0255943 A1 Nov. 1, 2007

(51) Int. Cl.
*H04L 29/06* (2006.01)
*H04L 9/08* (2006.01)

(52) U.S. Cl.
CPC .................................. *H04L 9/0894* (2013.01)

(58) Field of Classification Search
CPC ...................................................... H04L 9/0894
USPC ............................................................. 726/6
See application file for complete search history.

(56) References Cited

U.S. PATENT DOCUMENTS

| | | | |
|---|---|---|---|
| 6,169,803 B1 * | 1/2001 | Sako et al. ...................... | 380/44 |
| 6,820,204 B1 | 11/2004 | Desai et al. | |
| 7,392,386 B2 * | 6/2008 | Magennis et al. ............ | 713/168 |
| 2002/0080974 A1 * | 6/2002 | Grawrock ..................... | 380/282 |

(Continued)

FOREIGN PATENT DOCUMENTS

WO  WO 2005045550 A2 *  5/2005

OTHER PUBLICATIONS

Jøsang et al.; Trust requirements in identity management; Published in: Proceeding ACSW Frontiers '05 Proceedings of the 2005 Australasian workshop on Grid computing and e-research; 2005; vol. 44 pp. 99-108; ACM Digital Library.*

(Continued)

*Primary Examiner* — Bradley Holder
(74) *Attorney, Agent, or Firm* — BainwoodHuang

(57) ABSTRACT

A system for automating the recovery of a credential store, in which client software generates a temporary key pair based on a new password, and sends client information including the user's name, the public half of the temporary key pair, and the host name of the client computer system to a server system, from which the client information is passed to a recovery process. The client software process displays a prompt indicating that the user should call a help desk. A help desk administrator verifies the user's identity and approves the user's request by causing an approval message to be sent to the recovery process. The recovery process obtains recovery information consisting of either the decryption key(s) for the credential store, or a decrypted copy of the credential store, and encrypts the recovery information using the temporary public key. The client process downloads the recovery information from the server, and decrypts it using private key of the temporary key pair. The credential store can then be decrypted using the recovery information if necessary, then re-encrypted based on the new password. The encrypted recovery information is stored on the server and re-used for a certain period of time, after which it is deleted, thus allowing multiple copies of the credential store to be conveniently recovered.

17 Claims, 8 Drawing Sheets

(56) References Cited

U.S. PATENT DOCUMENTS

2002/0194095 A1* 12/2002 Koren ............................ 705/35
2003/0182584 A1   9/2003 Banes et al.
2004/0133797 A1   7/2004 Arnold
2004/0162786 A1   8/2004 Cross et al.
2005/0086510 A1   4/2005 Nicodemus et al.

OTHER PUBLICATIONS

Koufil et al.; A credential renewal service for long-running jobs; Published in: Grid Computing, 2005. The 6th IEEE/ACM International Workshop on; Date of Conference: Nov. 13-14, 2005; IEEE Xplore.*

* cited by examiner

METHOD AND SYSTEM FOR AUTOMATING THE RECOVERY OF A CREDENTIAL STORE WHEN A USER HAS FORGOTTEN THEIR PASSWORD USING A TEMPORARY KEY PAIR CREATED BASED ON A NEW PASSWORD PROVIDED BY THE USER

FIELD OF THE INVENTION

The present invention relates generally to managing electronic credentials, and more specifically to a method and system for automating the recovery of a credential store.

BACKGROUND OF THE INVENTION

Electronic credentials (also known as "digital credentials" or "credentials") are frequently used by computer systems and users to support processes and operations relating to authentication, identification, and/or authorization. Electronic credentials are the digital equivalent of paper documents and other tangible objects traditionally used for establishing a person's privileges, characteristics, identity, and so on. Electronic credentials may include such things as sign-in names, passwords, symmetric or asymmetric encryption keys, and/or other information associated with a user or process that uses the credentials.

Electronic credentials are typically maintained in one or more credential stores. Credential stores are often located in a user's computer system, or may be downloaded from a server to a user's computer system as needed. A credential store may be replicated across multiple computer systems, thus resulting in multiple copies of a credential store being stored across multiple systems.

Most credential stores are encrypted by an encryption key derived, directly or indirectly, from a password, in order to prevent unauthorized access. Unfortunately, humans are notoriously poor at remembering strong passwords, especially when required by security policies to change them frequently and never re-use them. Moreover, other access control mechanisms for keeping a credential store confidential are also subject to becoming invalid, and cryptographic tokens may be lost or locked out. As a result, some technique must be provided to recover an encrypted credential store after a password is forgotten, a cryptographic token lost or locked out, or another access control mechanism for the credential store is rendered invalid.

Existing systems often rely on a server-based copy of the credential store that is either effectively unencrypted, or that is encrypted under the same administrative key as all other stores. In both cases, a single point of failure exists, in that a single help desk employee can easily steal the contents of all the credential stores in the organization.

For example, existing server-based credential stores, such as "RSA Web Passport" and "RSA Credential Manager", provided by RSA Security, Inc., and similar products, can be accessed from multiple remote client systems. However, since it is access to the credential store in such systems that is protected by a password or other authentication device, but not the contents of the credential store itself, the credential store does not have any protections against an attack by a disgruntled administrator or a hacker gaining access to the local hard drive on the server system.

RFC 3760 describes a "Credential Server Framework" that allows for a credential store on the server to be encrypted with a key known to the server as well as a key derived from the user's "credential password", and distinguishes the credential password from the means of authentication to the server. However, that approach focuses on a protocol through which a client can communicate with the server, and fails to address the case in which a client has lost their means of authenticating to the server, except for inclusion of an optional server key that could also be used to decrypt the credential store.

TFS WorkstationControl from TFS Technology, Inc., encrypts centrally managed credential stores with an additional administrative key, so that an administrator can reset a user's password that is used to encrypt the credential store. This approach also provides a "File Recovery" process that encrypts the user's password-derived key with a single public recovery key, and allows administrators to decrypt files with the corresponding private key. A significant shortcoming of this approach is that it gives the administrator knowledge of the end user's new password, and allows any entity with the ability to change the credential store password unfettered access to that store.

Certification Authorities (CAs), as defined and specified by the PKIX working group of the IETF (Internet Engineering Task Force), are also in common use throughout the industry. CAs allow authorized individuals (RAs) to generate digital signatures using an encryption key to which they do not have direct access, in order to sign a set of information describing an identity to create a certificate, or to sign code for access control purposes. CAs provide entities who are not trusted with the actual encryption keys the ability to use those keys, based on using RSA (Rivest-Shamir-Adleman) private keys to generate certificates containing public keys and signatures. However, CAs also do not include support for recovering a credential store whose access control mechanism has been rendered invalid, such as when a user forgets their password.

For the above reasons and others, it would be desirable to have a new system for automating the recovery of a credential store that substantially prevents administrator users from obtaining access to credentials for an organization during the recovery process, and that allows for efficient recovery of multiple copies of a credential store.

SUMMARY OF THE INVENTION

To address the above described and other shortcomings of existing systems, a new method and system for automating the recovery of a credential store are disclosed that use a server-based process to decrypt individually-encrypted credential stores for users at the behest of authorized administrators. The disclosed system decreases the scope of vulnerability to attack from that of previous approaches, since direct access to the encryption keys used for the server-based recovery process can be limited to a small subset of trusted administrators, and even their access can be limited by requiring multiple administrators to collaborate to start the recovery process, or by storing the keys for the process on a secure hardware-based cryptographic device.

In response to an indication that the user has lost their password, a client recovery process prompts the user to enter a new password. The client software then generates a temporary RSA key pair based on the new password. The temporary key pair may also be based on some amount of other user specific information, such as the user's name or username, which may, for example, be stored within an unencrypted portion of the credential store. The client software process contacts a server system without authenticating, sending client information including the user's name, the public half of the temporary key pair, the host name of the client computer system, and optionally some implementation-specific information such as a timestamp identifying the version of recovery information to be used.

The user's name in the client information sent from the client software process may subsequently be used by the remotely executing recovery process as a primary search index to obtain recovery information from a database. The host name of the client computer system may be used for logging purposes by the remote recovery process, to maintain a record of where recovery requests originate from. The host name in the client information enables identification of requests coming from machines not associated with the end user, and/or tracking request sources when requests are for any reason determined to be suspicious or malicious. The timestamp enables the client software process to indicate exactly which version of recovery information is requested, in an embodiment in which timestamps are associated with versions of recovery information for the credential store of a given user.

The client information is passed to the recovery process, which may execute on the initially contacted server system, or on another, more tightly secured server. After the client information is successfully received by the recovery process, the client software processed is informed, and in response displays a prompt to the user, indicating that the user should call a help desk.

When the user calls the help desk, a help desk administrator verifies the user's identity, and potentially also checks attributes of the request found in an entry for the request within the queue of recovery requests at the recovery process. The administrator then takes an action, such as clicking on a button in a graphical user interface, that approves the user's request, for example by sending an approval message to the recovery process. The recovery process receives the approval message, and verifies that the help desk administrator has authority to approve the recovery request. The recovery process then acquires the key(s) needed to decrypt the credential store, and potentially also an encrypted backup copy of the credential store, for example from one or more recovery databases, based on identifying information such as the user's name, the host name of the client computer system, and/or the timestamp sent from the client process. The recovery process then prepares recovery information to be passed to the client process. The recovery information may include either the key or keys needed to decrypt the credential store on the client computer system, or a decrypted copy of credential store itself, that was decrypted by the recovery process on the server. The recovery process encrypts the recovery information using the temporary public key received from the client computer system, and causes the encrypted recovery information to be stored on the server system, from which it can be downloaded to the client system by the client software.

The recovery process may maintain a log of all recovery actions taken on the server for a given recovery operation on behalf of the client process. The log may be used to identify and/or track the source of malicious and/or suspicious recovery actions taken with regard to a credential store.

The client software then connects to the server, proves the identity of either the end user and/or the client computer system to the server with a challenge/response negotiation using the temporary key pair, and downloads the encrypted recovery information stored on the application server by the recovery process. The client software decrypts the recovery information using the private key of the previously generated temporary key pair, then uses the decrypted recovery information to recover the credential store, for example by decrypting the credential store using a key contained in the recovery information.

The decrypted credential store is then re-encrypted by the client software using an encryption key based on the new password, such as a symmetric key derived from the new password. The encrypted recovery information stored on the server will be deleted after a certain period of time, most likely measured in hours or days. Advantageously, if multiple copies of the credential store are maintained, the user can perform an abbreviated recovery process with regard to all other copies. The abbreviated process involves entering the previously entered new password again, and then bypassing all interactions with the help desk.

Thus there is disclosed a new system for automating the recovery of a credential store that substantially prevents administrator users from obtaining access to credentials for an organization during the recovery process, and that further provides an efficient technique for recovering additional copies of the credential store.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
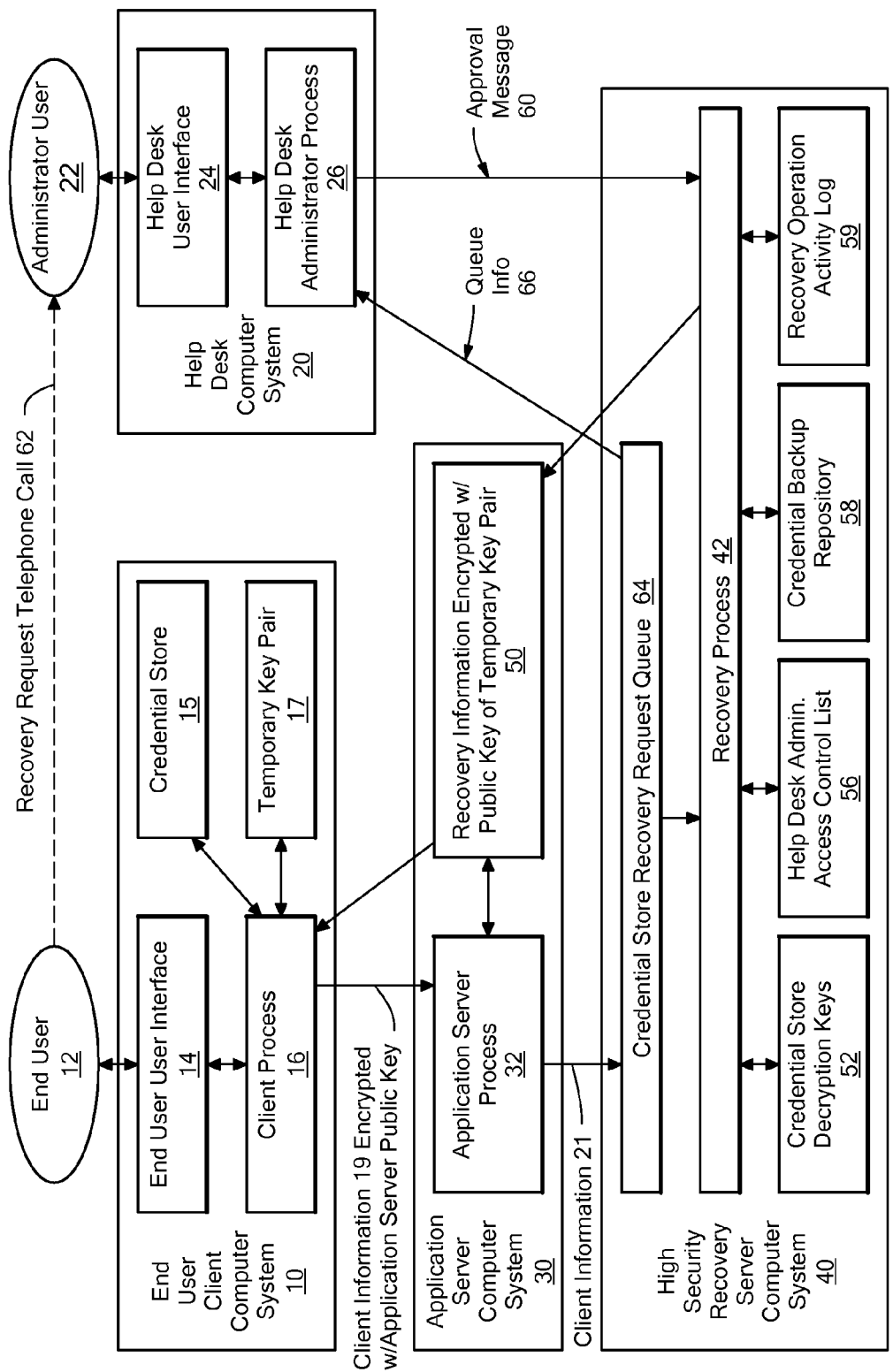
FIG. 1 is a block diagram showing hardware and software components in an illustrative embodiment of the disclosed system.

As shown in FIG. 1, hardware and software components in an illustrative embodiment of the disclosed system include an End User Client Computer System 10, an Application Server Computer System 30, a High Security Recovery Server Computer System 40, and a Help Desk Computer System 20. A Client Process 16 is software executing on the End User Client Computer System 10, an Application Server Process 32 is software executing on the Application Server Computer System 30, a Recovery Process 42 is software executing on the High Security Recovery Server Computer System 40, and a Help Desk Administrator Process 26 is software executing on the Help Desk Computer System 20. The Application Server Process 32 may, for example, be part of an electronic mail ("e-mail") application server process, or any other appropriate application server process for a given embodiment. Similarly, the Client Process 16 may be part of an e-mail client process, or any other appropriate client application process.

The End User Client Computer System 10, Application Server Computer System 30, High Security Recovery Server Computer System 40, and Help Desk Computer System 20 may be remotely located from each other, and are communicably interconnected through one or more communication networks, such as a Local Area Network (LAN), Virtual Local Area Network (VLAN), the Internet, and/or other specific type of communication network. The End User Client Computer System 10, Application Server Computer System 30, High Security Recovery Server Computer System 40, and Help Desk Computer System 20 communicate with each other using any specific type of communication protocol and/or message format the communication network(s).

The computer systems 10, 20, 30 and 40 of FIG. 1 each include at least one processor, program storage, such as memory, for storing program code executable on the processor, and one or more input/output devices and/or interfaces, such as data communication and/or peripheral device interfaces. The computer systems 10, 20, 30 and 40 may further include appropriate operating system software.

The High Security Recovery Computer System 40 may, for example, be made relatively more secure through use of a network topology that makes it inaccessible to direct communications from client computer systems such as the End User Client Computer System 10. Such a network topology would allow direct access to the High Security Recovery Computer System 40 only through application server computer systems such as the Application Server Computer System 30, and administrative systems such as the Help Desk Computer System 20. Such network isolation of the High Security Recovery Computer System 40 may, for example, be accomplished using such mechanisms as a firewall component and/or DMZ (DeMilitarized Zone) between the High Security Recovery Computer System 40 and the End User Client Computer System 10.

During operation of the embodiment shown in FIG. 1, the Client Process 16 generates the End User Interface 14, through which the End User 12 can provide an indication that they have lost or forgotten a password needed for accessing the Credential Store 15, which has previously been encrypted using one or more encryption keys based on that password. The Credential Store 15 may store any specific type of credentials, such as sign-in names, passwords, symmetric or asymmetric encryption keys, and/or other information associated with the End User 12, who uses the contents of the Credential Store 15 in authentication procedures necessary to access or use one or more resources and/or services.

In response to the indication that the End User 12 has lost the password necessary to recovery the Credential Store 15, the Client Process 16 prompts End User 12 to obtain a new password. The Client Process 16 then creates Temporary Key Pair 17 based on the new password. The Temporary Key Pair 17 may also be based on some amount of other user specific information, such as the user's name or username. Such other user-specific information may, for example, be stored within an unencrypted portion of the Credential Store 15. For example, the Temporary Key Pair 17 may consist of a private key and a public key, as is typical in a conventional password-based public key encryption (PKE) method. The Temporary Key Pair 17 may be maintained temporarily by the Client Process 16 in memory, or may be deleted after it is used by the Client Process 16, since it can be regenerated as needed based on the user re-entering the new password.

The Client Process 16 then encrypts Client Information 19 with a public key of the Application Server Computer System 30, and sends the encrypted Client Information 19 to the Application Server Process 32 executing on the Application Server Computer System 30. The Client Information 19 may, for example, include such things as the name or a user name of the End User 12, the public key of the Temporary Key Pair 17, a host name of the End User Client Computer System 10, and optionally some implementation-specific information such as a timestamp to be used to help identifying the correct recovery information to be used to recover the Credential Store 15.

The Application Server Process 32 then decrypts the Client Information 19 using a private key of the Application Server Computer System 30, and forwards the result as Client Information 21 to the High Security Recovery Server Computer System 40. For example, the Client Information 21 may be received and stored as a credential store recovery request within a Credential Store Recovery Request Queue 64. When the Client Information 21 reaches the head of the Credential Store Recovery Request Queue 64, it is passed to the Recovery Process 42.

While the Recovery Process 42 is shown in FIG. 1 executing on a separate server system from the Application Server Computer System 30, the disclosed system is not limited to such an embodiment. Alternatively, both the Application Server Process 32 and Recovery Process 42 may execute on the same server computer system or systems.

A prompt is then provided in the End User User Interface 14 indicating that the End User 12 should place a Recovery Request Telephone Call 62 to the Administrator User 22. For example, such a prompt may be generated either after the Client Information 21 is successfully received by the Recovery Process 42, or after the Client Information 21 is successfully stored in a recovery request in the Credential Store Recovery Request Queue 64. Alternatively, the prompt to place the Recovery Request Telephone Call 62 may be generated without waiting for the Client Information to be received by the Recovery Server Computer System 40.

In response to the Recovery Request Telephone Call 62, the Administrator User 22 uses the Help Desk User Interface 24 to verify the identity of the End User 12, for example by accessing authentication data such as a password for the End User 12, through the Help Desk User Interface 24, and by asking the End User 12 to state the password in the Recovery Request Telephone Call 62. The Administrator User 22 may also check the contents and/or status of the Credential Store Recovery Request Queue 64 through the Help Desk User Interface 24, based on the received Queue Information 66, which contains indications of where currently queued recovery requests were received from and other request attributes, in order to determine whether to approve recovery of the Credential Store 15 by the Recovery Process 42.

If the Administrator User 22 successfully verifies the identity of the End User 12 in the Recovery Request Telephone Call 62, and the contents and/or status of the Credential Store Recovery Request Queue 64 are determined to be acceptable, then the Administrator User 22 approves recovery of the Credential Store 15 by the Recovery Process 42, for example by clicking on a button within the Help Desk User Interface 24. As a result, the Help Desk Administrator Process 26 indicates approval of the request to the Recovery Process 42, for example by sending an Approval Message 60 to the Recovery Process 42.

When the Recovery Process 42 receives approval to recover the Credential Store 15 from the Help Desk Administrator Process 26, it verifies that the Administrator User 22 has the authority to approve recovery of the Credential Store 15. Such verification may, for example, be accomplished by comparing a name or user name of the Administrator User 22 contained in the approval message with the contents of a Help Desk Administrator Access Control List 56, which contains the names or user names of those persons having the authority to approve recovery of the Credential Store 15.

The disclosed system may, for example, be embodied such that a separate access control list is maintained for each separate credential store. Such separate access control lists may each be associated with and located using a name or username of the user or host name of the client computer system for the corresponding credential store. Moreover, the disclosed system may alternatively require that authorization for a requested recovery operation be provided by multiple administrator users. For example, the entry or entries in an access control list for a given credential store may indicate a group of administrator users, all of whom must provide authorization before a recovery process can be performed on that credential store.

Now again with reference to the embodiment of FIG. 1, if the name or user name of the Administrator User 22 is found by the Recovery Process 42 in the Access Control List 56, then the Recovery Process 42 acquires one or more key(s) needed to decrypt the Credential Store 15 from the Credential Store Decryption Keys 52, and potentially also an encrypted backup copy of the Credential Store 15 from the Credential Backup Repository 58. For example, the Recovery Process 42 may obtain an appropriate decryption key from the Credential Store Decryption Keys 52, and/or a backup copy of the encrypted Credential Store 15 from the Credential Backup Repository 58, based on the name or user name of the End User 12 and/or other information from the Client Information 21. A timestamp from the Client Information 21 may also be used to identify a specific version of decryption key and/or backup copy of the Credential Store 15 to be obtained.

The Recovery Process 42 of FIG. 1 next prepares recovery information to be passed to the Client Process 16. The recovery information may include a key or keys obtained from the Credential Store Decryption Keys 52 that needed to decrypt the Credential Store 15 on the End User Client Computer System 10. The recovery information may alternatively include a decrypted copy of Credential Store 15, decrypted by the Recovery Process 42 on the Recovery Server Computer System 40.

The Recovery Process 42 then encrypts the recovery information using the temporary public key received in the Client Information 21, and causes the resulting Recovery Information Encrypted with the Public Key of the Temporary Key Pair 50 to be stored on the Application Server Computer System 30 for downloading by the Client Process 16 to the End User Client Computer System 10.

The Recovery Process 42 maintains a Recovery Operation Activity Log 59 that records all recovery actions taken on the Recovery Server Computer System 40 with regard to processing any requests to recover the Credential Store 15. The Recovery Operation Activity Log 59 maintains information that may be useful in identifying and/or tracking down the source of malicious and/or suspicious recovery requests. Such log information may include client information such as a host name of the client computer system from which a recovery request is received. The Recovery Operation Activity Log 59 is made available to, or sent to, the End User 12, for example via the Client Process 16. The records stored in Recovery Operation Activity Log 59 prevent administrators from stealing credential stores without being noticed.

The Client Process 16 connects to the Application Server Computer System 30, and proves the identity of the End User 12 to the Application Server Process 32, for example using a challenge/response negotiation using the Temporary Key Pair 17. After proving its identity, the Client Process 16 then downloads the Recovery Information Encrypted with the Public Key of the Temporary Key Pair 50 from the Application Server Computer System 30. The Client Process 16 then decrypts the recovery information using the private key of the Temporary Key Pair 17, and uses the decrypted recovery information to recover the Credential Store 15, for example by decrypting the Credential Store 15 using one or more keys contained in the decrypted recovery information.

The decrypted Credential 15 is then re-encrypted by the Client Process 16 based on the previously entered new password, for example using a symmetric key generated based on the new password. The Recovery Information Encrypted with the Public Key of the Temporary Key Pair 50 is maintained on the Server Computer System 30 until it is later deleted after a predetermined period of time, most likely measured in hours or days. Advantageously, if multiple copies of the Credential Store are maintained on multiple separate systems, the End User 12 can perform an abbreviated process with regard to recovering all other copies. For example, if another copy of the Credential Store 15 is maintained on a lap top computer system or the like also belonging to the End User 12, the End User 12 would simply indicate to a client recovery process executing on that system that the password was lost, and then enter the same new password as was entered into the Client Computer System 10, and upon which the Temporary Key Pair 17 were based. The client process executing on the lap top computer system would then re-generate the Temporary Key Pair 17 on the lap top computer system based on the new password. When the client process executing on the lap top computer system sent client information to the Application Server Process 32, the Application Server Process 32 would determine that Recovery Information Encrypted with the Public Key of the Temporary Key Pair 50 had not yet been deleted, and would accordingly allow the client process on the lap top computer system to download the Recovery Information Encrypted with the Public Key of the Temporary Key Pair 50 onto the lap top computer system. Since the client process on the lap top computer system had re-generated the Temporary Key Pair 17 on the lap top computer system, it could use the private key from the re-generated Temporary Key Pair 17 to decrypt the recovery information and recover the copy of the Credential Store 15 on the lap top computer system, for example by decrypting the copy of the Credential Store 15 on the lap top computer system using one or more keys contained within the recovery information. This abbreviated process thus involves only entering the previously entered new password again, and then bypasses all interactions with the help desk.

Figure 2:
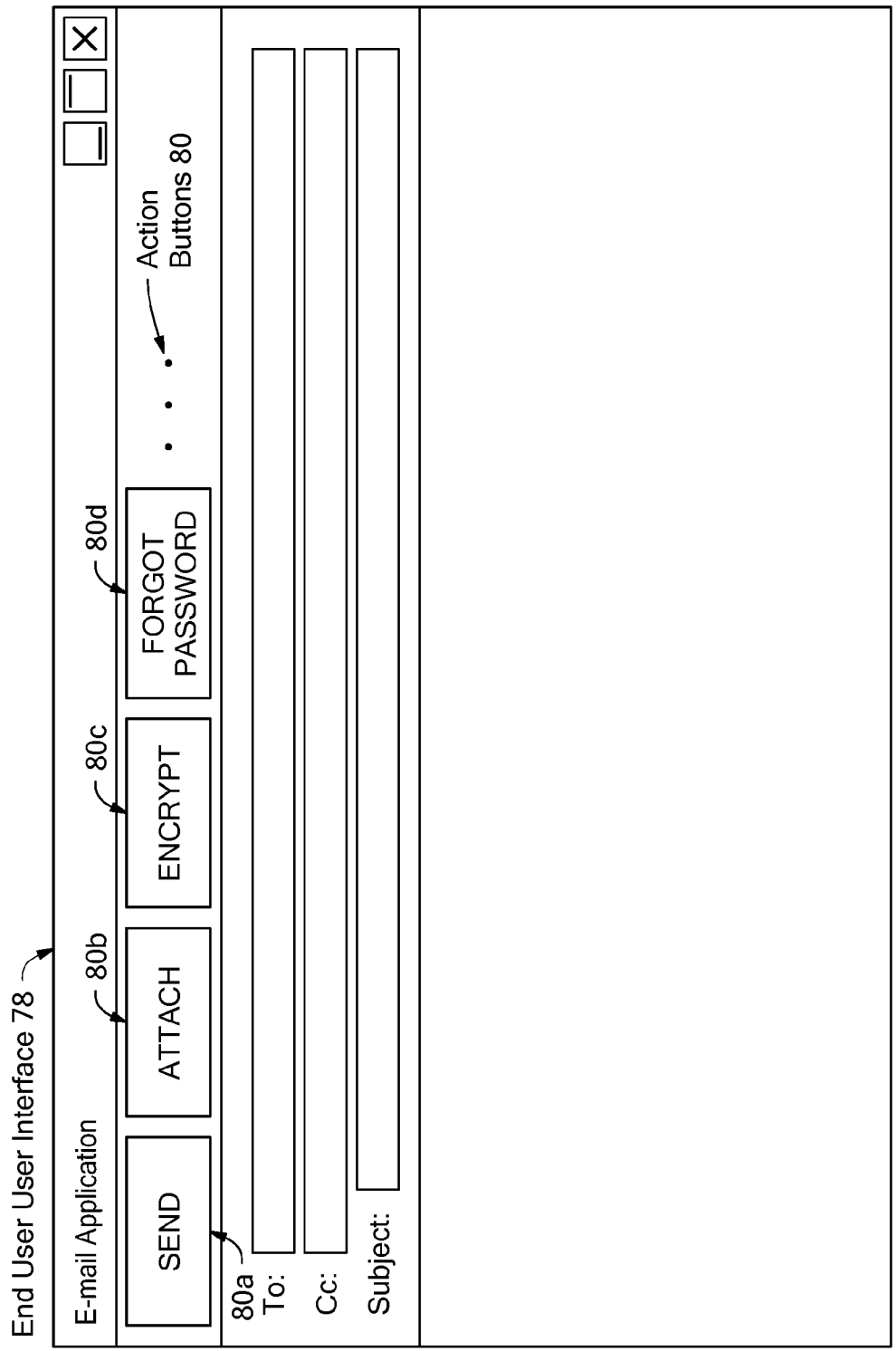
FIG. 2 is a simplified screen shot illustrating a portion of a graphical user interface provided by an embodiment of the disclosed system for a user to enter an indication that a password has been lost or forgotten.

FIG. 2 is a simplified screen shot showing an example of an End User User Interface 78, as may be provided by the Client Process 16 of FIG. 1 in an illustrative embodiment. The End User User Interface 78 in the example of FIG. 2 is a user interface to an e-mail application client program. As shown in FIG. 2, the End User User Interface 78 includes a number of Action Buttons 80, including a Send Button 80a for indicating that an e-mail message is ready to be sent, an Attach button 80b for attaching one or more documents to an e-mail message prior to sending, an Encrypt button 80c for causing an e-mail message to be encrypted when it is sent, and a Forgot Password button 80d that enables the End User 12 of FIG. 1 to indicate to the Client Process 16 that the password for the Credential Store 15 has been lost or forgotten.

While the example of FIG. 2 shows a specific user interface configuration associated with an e-mail application program, the disclosed system is not limited to such an embodiment. Accordingly, any other specific user interface configuration may be used in the alternative in order to obtain an indication from the user that the password for the Credential Store 15 has been lost or forgotten.

Figure 3:
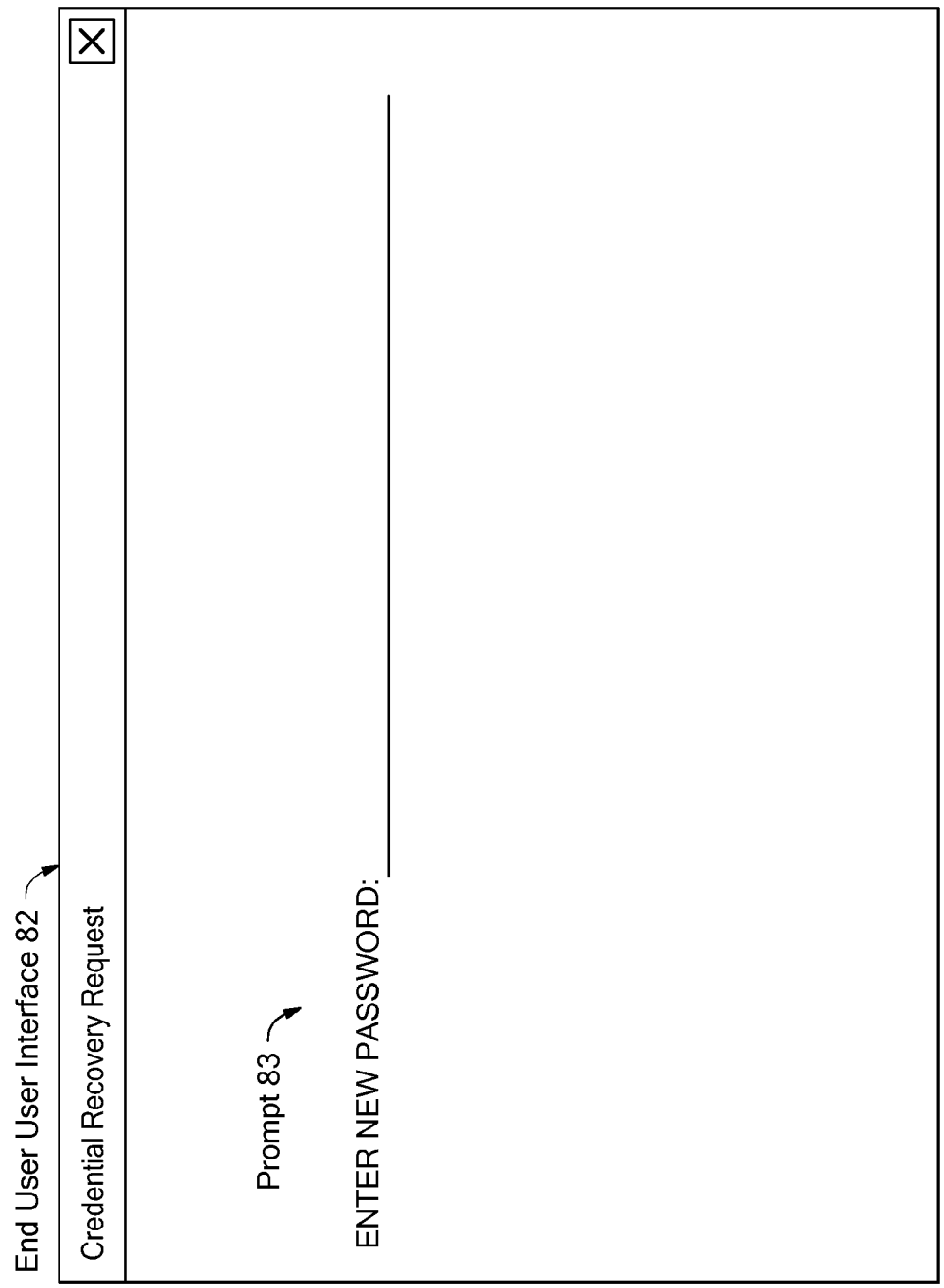
FIG. 3 is a simplified screen shot illustrating a portion of a graphical user interface provided by an embodiment of the disclosed system for a user to enter a new password.

FIG. 3 is a simplified screen shot showing an example of an End User User Interface 82 as may be provided by the Client Process 16 in an embodiment of the disclosed system to obtain a new password from the End User 12. As shown in FIG. 3, the End User User Interface 82 includes a Prompt 83 that enables the End User 12 to enter a new password. Again, while the example of FIG. 3 shows a specific user interface configuration for obtaining a new password from the End User 12, any other specific user interface configuration may alternatively be used for this purpose.

Figure 4:
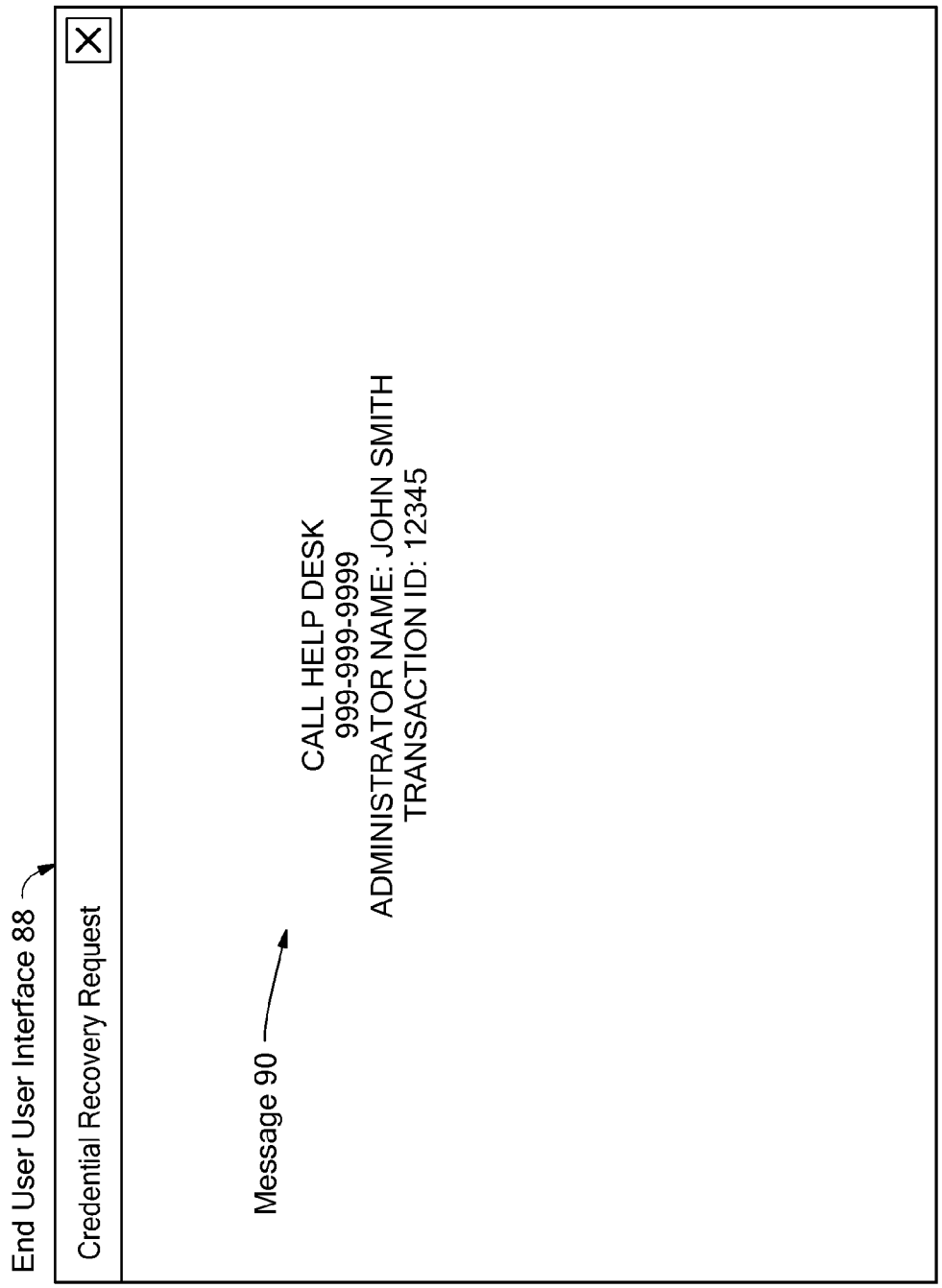
FIG. 4 is a simplified screen shot illustrating a portion of a graphical user interface provided by an embodiment of the disclosed system to alert a user to call a help desk to obtain authorization for a recovery request.

FIG. 4 is a simplified screen shot showing an example of an End User User Interface 88 generated by the Client Process 16 of FIG. 1, and including a Message 90 indicating that the End User 12 should call the Administrator User 22 to obtain approval for a request to recover the Credential Store 15. The example user interface of FIG. 4 is just one possibility with regard to prompting the End User 12 to place a call to the Administrative User 22, and other specific user interfaces may be used for this purpose in the alternative.

Figure 5:
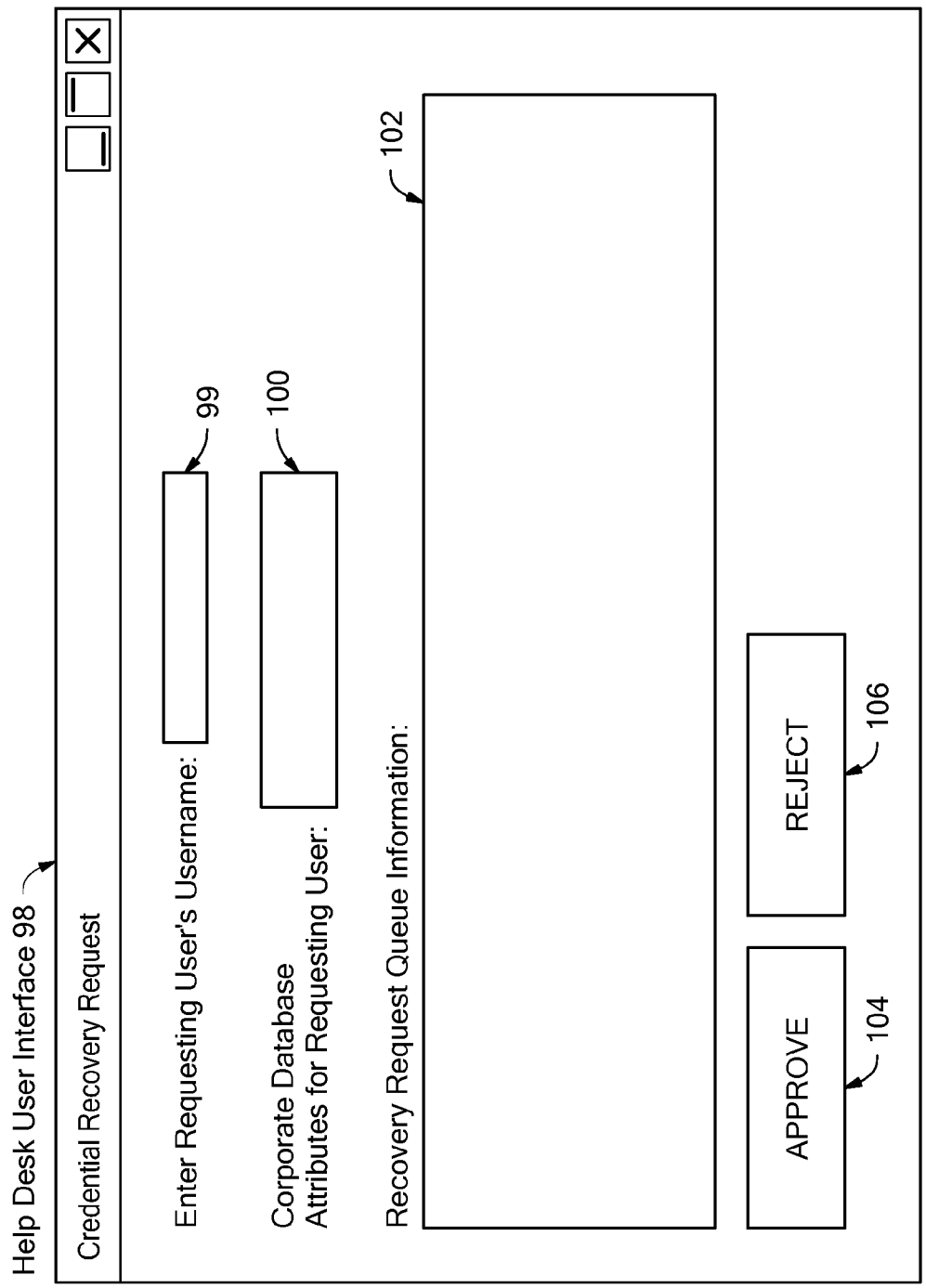
FIG. 5 is a simplified screen shot illustrating a portion of a graphical user interface provided by an embodiment of the disclosed system to support a help desk administrator in determining whether to approve or reject a credential store recovery request.

FIG. 5 is a simplified screen shot showing an example of a Help Desk User Interface 98 through which an administrator user can verify the identity of a calling user requesting recovery of a credential store, and can examine information regarding the recovery request queue. In the example of FIG. 5, the Help Desk User Interface 98 includes a field 99 for entry by the administrator user of the username of the user requesting recovery of the credential store, provided through a phone call. After the username of the requesting user is entered into the field 99, authentication information associated with the requesting user may be displayed to the administrator user, for example through the Corporate Database Attributes for Requesting User field 100. The user attributes displayed in the field 100 may, for example, consist of various information associated with the requesting user retrieved from a corporate database, such as a password for the requesting user, a list of host names of computer systems that are under the control of the requesting user, and/or other information. The administrator user can then compare the information provided in the field 100 with information provided by the requesting user over the phone, and with information contained in the Recovery Request Queue Information field 102, to confirm that the requesting user is in fact who they claim to be. The Recovery Request Queue Information field 102 displays information regarding the contents of a Recovery Request Queue on a Recovery Server System, including client information in an entry of the Recovery Request Queue corresponding to the recovery request that the End User 12 initiated, such as a host name of a client computer system from which the recovery request was received. Accordingly, the administrator user can compare the contents of the Recovery Request Queue Information field 102 with the contents of the field 100 to determine whether a recovery request was received from a client computer system that is not under the control of the requesting user, and therefore should not be approved.

If the administrator user determines that the request should be approved, then the administrator user can click on the Approve button 104, which causes an approval message to be sent to the recovery process. Otherwise, if the administrator user determines that the request should not be approved, the administrator user can click on the Reject button 106, which may result in a rejection message being sent to the recovery process.

As with FIGS. 2-4, the illustrative user interface shown in FIG. 5 is just one possible design and layout for a specific user interface that may be provided by an embodiment of the disclosed system to an administrator user, and any other specific user interface design may be used in alternative embodiments for this same purpose.

Figure 6:
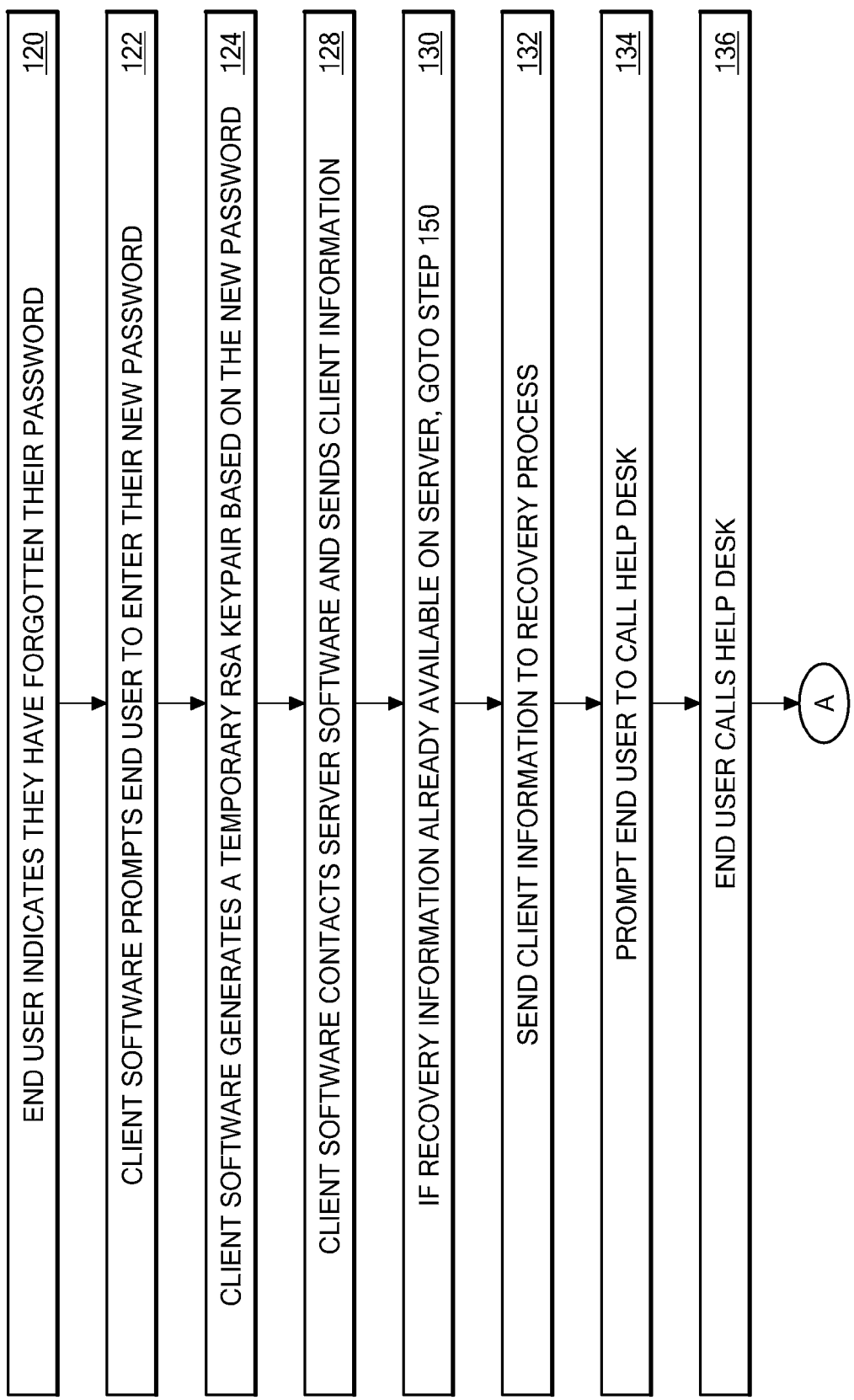
FIG. 6 is a flow chart illustrating steps performed by an embodiment of the disclosed system.

FIG. 6 is a flow chart of steps performed during operation of an embodiment of the disclosed system. At step 120, the end user indicates that they have lost or forgotten their password. At step 122, client software prompts the end user to enter a new password. The client software then generates a temporary key pair at step 124, based on the new password. The temporary key pair generated at step 124 may also be based on some amount of other user specific information, such as the user's name or username. Such user specific information may, for example, be stored within an unencrypted portion of the credential store.

The client software sends client information to a server system 128, including the public key of the temporary key pair, a name or user name associated with the end user, a host name of the client computer system, and optionally other information such as a time stamp associated with the current recovery request and indicating when the request was made. If the server system determines at step 130 that recovery information is currently stored on the server system that can be used to recover the credential store, and that can be decrypted using the private key of the temporary key pair, then the flow continues after step 130 with step 150. Otherwise after step 130, at step 132, the client information sent from the client software at step 128 is sent to a software recovery process.

At step 134 the client software provides a prompt to the end user indicating that the end user should call a help desk number and talk to an administrator user that can approve the request to recover the credential store. In response to the prompt at step 134, the end user calls the help desk at step 136, and asks that the request to recover the credential store be approved, and provides any identifying information requested by the administrator user.

Figure 7:
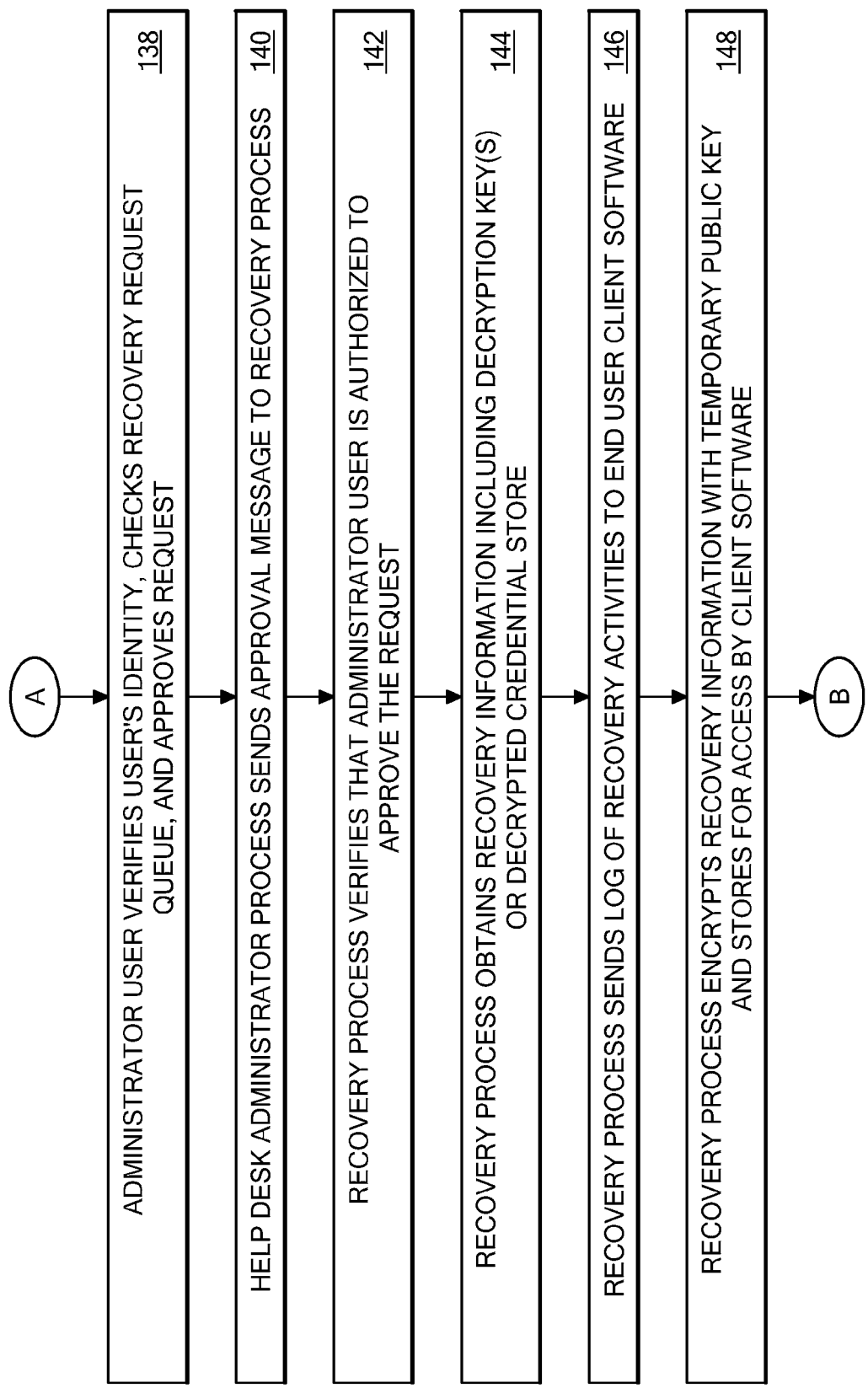
FIG. 7 is a flow chart continuing the steps of FIG. 6.

FIG. 7 is a flow chart continuing the steps of FIG. 6, and at step 138 the administrator user verifies the requesting user's identity, for example by checking a password provided by the requesting user over the phone against a stored password. Also at step 138, the administrator user checks the contents of the credential store recovery request queue on the recovery server to determine if the request should be approved. If the administrator user determines that the request should be approved, then the administrator user causes an approval message to be sent to the server system running the recovery process at step 140. At step 142, the recovery process verifies that the administrator user is authorized to approve recovery of the credential store, for example by checking whether the administrator user is listed in an access control list associated with the credential store and/or with the requesting user. The recovery process on the server system obtains recovery information including the decryption key or keys needed to decrypt the credential store or a decrypted copy of the credential store at step 144. All recovery activities associated with a credential store recovery request are logged at the server system, and may be reported to the client computer system of the recovery requesting user, for example by way of sending the log to the requesting user at step 146.

Figure 8:
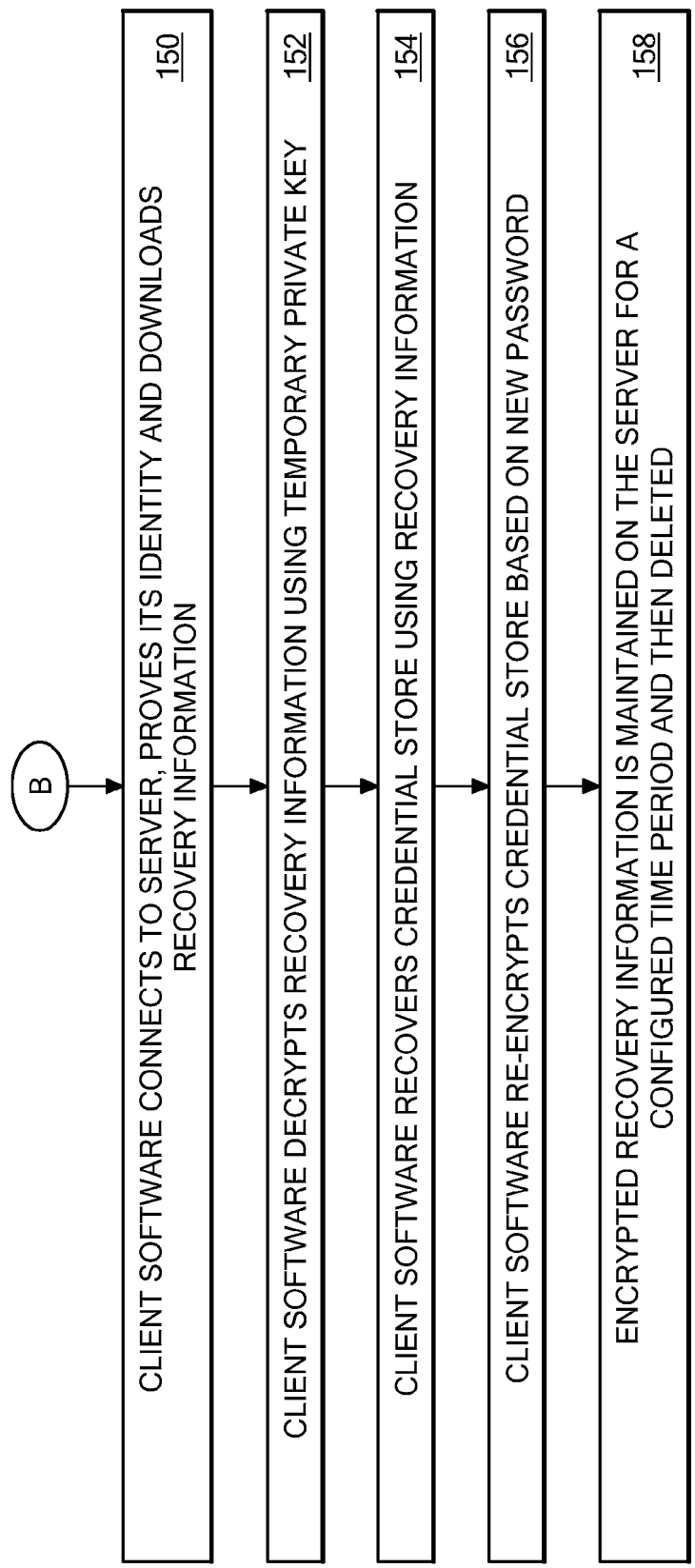
FIG. 8 is a flow chart continuing the steps of FIGS. 6 and 7.

At step 148, the recovery process on the server system encrypts the recovery information with the public key from the temporary key pair generated at the end user client computer system, and stores the encrypted recovery information such that it can be downloaded by the client process. Then as shown in FIG. 8, at step 150, the client software connects to the server system, proves the identity of the requesting end user, and downloads the encrypted recovery information from the server system. The client software then decrypts the recovery information on the end user client computer system using the private key of the temporary key pair at step 152. At step 154 the client software recovers the contents of the credential store based on the decrypted recovery information, and at step 156 the client software re-encrypts the credential store using a key or keys based on the new password. As indicated in step 158, the encrypted recovery information is maintained on the server for a pre-configured time period, after which it is deleted.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative graphical user interface constructs, one skilled in the art will recognize that they may be embodied using a variety of other alternative graphical user interfaces.

We claim:

1. A method, embodied in at least one computer system, of recovering a user's credential store, comprising at least the following steps performed by said computer system:
   receiving an indication from said user that said user has forgotten their previous password;
   responsive to receipt of said indication that said user has forgotten their password, generating a user interface object in a user interface displayed to said user, said user interface object for receiving a new password from said user;
   receiving said new password from said user through said user interface object;
   generating, on a client computer system, a temporary encryption key pair based on said new password obtained from said user, said temporary encryption key pair including a public key and a private key;
   sending said public key from said client computer system to a recovery process executing on a recovery server computer system;
   receiving, by said recovery process, an approval message from a help desk administrator;
   obtaining, by said recovery process, recovery information associated with said credential store;
   encrypting, by said recovery process responsive to receipt of said approval message, said recovery information using said public key;
   downloading said encrypted recovery information to said client computer system;
   decrypting said recovery information on said client computer system using said private key; and
   obtaining a decrypted copy of said credential store based on said decrypted recovery information to recover the credential store.

2. The method of claim 1, further comprising:
   wherein said recovery information includes a decryption key associated with said credential store;
   wherein said obtaining said decrypted copy of said credential store based on said decrypted recovery information comprises decrypting said credential store using said decryption key contained in said decrypted recovery information; and
   re-encrypting the decrypted credential store on the client computer system based on the newly obtained password.

3. The method of claim 2, further comprising:
   prompting said user to call said help desk administrator upon receipt of said public key by said recovery process;
   providing a help desk user interface on a help desk computer system, wherein said help desk user interface provides indication of the contents of a queue of recovery requests pending processing by said recovery process;
   wherein said help desk user interface further provides a user interface mechanism enabling said help desk administrator to indicate that said approval message should be sent to said recovery process; and
   verifying, by said recovery process, that said help desk administrator is authorized to approve recovery of said credential store.

4. The method of claim 3, further comprising:
   wherein said sending said public key from said client computer system to said recovery process executing on a recovery server computer system further comprises sending client information from said client computer system to said recovery process, wherein said client information further includes a user name associated with said user, a host name of said client computer system, and a timestamp; and
   wherein said obtaining said recovery information by said recovery process is responsive, at least in part, to said user name and said timestamp.

5. The method of claim 4, further comprising:
   storing said encrypted recovery information on said server computer system for a predetermined time period; and deleting said encrypted recovery information from said server computer system upon expiration of said predetermined time period.

6. The method of claim 5, further comprising:
sending said client information from said client computer system to an application server computer system;
sending said client information from said application server computer system to a recovery server computer system on which said recovery process executes;
forwarding said recovery information from said recovery server computer system to said application server computer system; and
wherein said downloading said recovery information to said client computer system includes authenticating said client computer system by said application computer system based on said temporary encryption key pair, and downloading said recovery information to said client computer system from said application computer system.

7. The method of claim 6, wherein said obtaining said recovery information associated with said credential store is responsive to receipt of a plurality of approval messages from a plurality of corresponding help desk administrators.

8. The method of claim 7, further comprising:
wherein said public key from said client computer system is received by said recovery process executing on said recovery server computer system as part of an initial recovery request, wherein said initial recovery request is to recover a first copy of said credential store stored on said client computer system;
receiving a subsequent recovery request by said recovery process, wherein said subsequent recovery request is to recover a second copy of said credential store stored on another computer system;
sending, in the event that said receiving said subsequent recovery request occurs after receipt of said first recovery request and receipt of said approval message, but prior to deletion of said encrypted recovery information, said encrypted recovery information to said another computer system without receiving further approval from any help desk administrator.

9. A system for recovering a user's credential store, comprising:
at least one processor;
at least one non-transitory computer readable memory, said computer readable memory having program code stored thereon for, when executed on said processor, recovering the user's credential store, said program code comprising:
program code for receiving an indication from said user that said user has forgotten their previous password;
program code for, responsive to receipt of said indication that said user has forgotten their password, generating a user interface object in a user interface displayed to said user, said user interface object for receiving a new password from said user;
program code for receiving said new password from said user through said user interface object;
program code for generating, on a client computer system, a temporary encryption key pair based on said new password obtained from said user, said temporary encryption key pair including a public key and a private key;
program code for sending said public key from said client computer system to a recovery process executing on a recovery server computer system;
program code for receiving, by said recovery process, an approval message from a help desk administrator;
program code for obtaining, by said recovery process, recovery information associated with said credential store;
program code for encrypting, by said recovery process responsive to receipt of said approval message, said recovery information using said public key;
program code for downloading said encrypted recovery information to said client computer system;
program code for decrypting said recovery information on said client computer system using said private key; and
program code for obtaining a decrypted copy of said credential store based on said decrypted recovery information to recover the credential store.

10. The system of claim 9, further comprising:
wherein said recovery information includes a decryption key associated with said credential store;
wherein said program code for obtaining said decrypted copy of said credential store based on said decrypted recovery information comprises program code for decrypting said credential store using said decryption key contained in said decrypted recovery information; and
said program code further comprising re-encrypting the decrypted credential store on the client computer system based on the newly obtained password.

11. The system of claim 10, said program code further comprising:
program code for prompting said user to call said help desk administrator upon receipt of said public key from said temporary encryption key pair by said recovery process;
program code for providing a help desk user interface on a help desk computer system, wherein said help desk user interface provides indication of the contents of a queue of recovery requests pending processing by said recovery process;
wherein said help desk user interface further provides a user interface mechanism enabling said help desk administrator to indicate that said approval message should be sent to said recovery process; and
program code for verifying, by said recovery process, that said help desk administrator is authorized to approve recovery of said credential store.

12. The system of claim 11, further comprising:
wherein said program code for sending said public key from said client computer system to said recovery process executing on a recovery server computer system further comprises program code for sending client information from said client computer system to said recovery process, wherein said client information further includes a user name associated with said user, a host name of said client computer system, and a timestamp; and
wherein said program code for obtaining said recovery information by said recovery process is responsive, at least in part, to said user name and said timestamp.

13. The system of claim 12, said program code further comprising:
program code for storing said encrypted recovery information on said server computer system for a predetermined time period; and
program code for deleting said encrypted recovery information from said server computer system upon expiration of said predetermined time period.

14. The system of claim 13, said program code further comprising:

program code for sending said client information from said client computer system to an application server computer system;

program code for sending said client information from said application server computer system to a recovery server computer system on which said recovery process executes;

program code for forwarding said recovery information from said recovery server computer system to said application server computer system; and wherein said program code for downloading said recovery information to said client computer system includes program code for authenticating said client computer system by said application computer system based on said temporary encryption key pair, and for downloading said recovery information to said client computer system from said application computer system.

15. The system of claim 14, wherein said program code for obtaining said recovery information associated with said credential store is responsive to receipt of a plurality of approval messages from a plurality of corresponding help desk administrators.

16. The system of claim 15, further comprising:
wherein public key from said client computer system received by said recovery process executing on said recovery server computer system is part of an initial recovery request, wherein said initial recovery request is to recover a first copy of said credential store stored on said client computer system;

program code for receiving a subsequent recovery request by said recovery process, wherein said subsequent recovery request is to recover a second copy of said credential store stored on another computer system;

program code for, in the event that said receiving said subsequent recovery request occurs after receipt of said first recovery request and receipt of said approval message, but prior to deletion of said encrypted recovery information, sending said encrypted recovery information to said another computer system without receiving further approval from any help desk administrator.

17. A computer program product including a computer readable storage medium, said computer readable storage medium not comprising a propagated signal, said computer readable storage medium having program code stored thereon for recovering a user's credential store, said program code comprising:

program code for receiving an indication from said user that said user has forgotten their previous password;

program code for, responsive to receipt of said indication that said user has forgotten their password, generating a user interface object in a user interface displayed to said user, said user interface object for receiving a new password from said user;

program code for receiving said new password from said user through said user interface object;

program code for generating, on a client computer system, a temporary encryption key pair based on said new password obtained from said user, said temporary encryption key pair including a public key and a private key;

program code for sending said public key from said client computer system to a recovery process executing on a recovery server computer system;

program code for receiving, by said recovery process, an approval message from a help desk administrator;

program code for obtaining, by said recovery process, recovery information associated with said credential store;

program code for encrypting, by said recovery process responsive to receipt of said approval message, said recovery information using said public key;

program code for downloading said encrypted recovery information to said client computer system;

program code for decrypting said recovery information on said client computer system using said private key; and program code for obtaining a decrypted copy of said credential store based on said decrypted recovery information to recover the credential store.

* * * * *